(12) United States Patent
Cherewka et al.

(10) Patent No.: US 10,396,854 B2
(45) Date of Patent: Aug. 27, 2019

(54) SPUR ISOLATION IN A FIELDBUS NETWORK

(71) Applicant: Phoenix Contact Development and Manufacturing, Inc., Middletown, PA (US)

(72) Inventors: Michael Colin Cherewka, Mechanicsburg, PA (US); Brenton Eugene Helfrick, Middletown, PA (US); David Katz, Hummelstown, PA (US); Aaron Richard Kreider, Mount Joy, PA (US); Todd Eugene Shadle, Camp Hill, PA (US)

(73) Assignee: Phoenix Contact Development and Manufacturing, Inc., Middletown, PA (US)

( * ) Notice: Subject to any disclaimer, the term of this patent is extended or adjusted under 35 U.S.C. 154(b) by 294 days.

(21) Appl. No.: 15/513,629

(22) PCT Filed: Oct. 14, 2015

(86) PCT No.: PCT/US2015/055423
§ 371 (c)(1),
(2) Date: Mar. 23, 2017

(87) PCT Pub. No.: WO2016/061162
PCT Pub. Date: Apr. 21, 2016

(65) Prior Publication Data
US 2017/0250734 A1    Aug. 31, 2017

Related U.S. Application Data

(60) Provisional application No. 62/064,118, filed on Oct. 15, 2014.

(51) Int. Cl.
*H04B 3/56* (2006.01)
*H04L 12/10* (2006.01)
*H04L 12/40* (2006.01)

(52) U.S. Cl.
CPC ............. *H04B 3/56* (2013.01); *H04L 12/10* (2013.01); *H04L 12/40045* (2013.01);
(Continued)

(58) Field of Classification Search
CPC ..... H04B 3/56; H04L 12/10; H04L 12/40045; H04L 2012/40221; Y02D 50/30;
(Continued)

(56) References Cited

U.S. PATENT DOCUMENTS 6,614,634 B1    9/2003  Westerfeld et al.
8,242,901 B2    8/2012  Indefrey et al.
(Continued)

FOREIGN PATENT DOCUMENTS

JP    2002091517 A    3/2002
JP    2005293569 A    10/2005
(Continued)

OTHER PUBLICATIONS

Fieldbus Wiring Guide, 4th Edition, Doc. No. 501-123 Rev.: E.0, Relcom Inc., 2004-2011, pp. 3 (Year: 2011).*
(Continued)

*Primary Examiner* — Benny T Lee
*Assistant Examiner* — Hafizur Rahman
(74) *Attorney, Agent, or Firm* — Hooker & Habib, P.C.

(57) ABSTRACT

A method for providing galvanic isolation between an input or trunk interface (30) and multiple outputs or spur interfaces (38) for connecting field devices (14) to a trunk (20) of a two-wire (44a, 44b) process control network (10) includes connecting multiple sets of multiple spur interfaces to respective isolating elements (34). Each isolating element
(Continued)

(34) connects a respective set of outputs or spur interfaces (38) to the trunk interface (30) and galvanically isolates (40, 42) the respective set of spur interfaces (38) from the trunk interface (30). Field devices (14) attached to different sets of spur interfaces are also galvanically isolated from one another.

18 Claims, 4 Drawing Sheets

(52) U.S. Cl.
CPC .............. *G05B 2219/25462* (2013.01); *G05B 2219/31121* (2013.01); *G05B 2219/34423* (2013.01); *H04L 2012/40221* (2013.01); *Y02D 50/30* (2018.01)

(58) Field of Classification Search
CPC ........... G05B 2219/25462; G05B 2219/31121; G05B 2219/34423
USPC ........................................................ 333/131
See application file for complete search history.

(56) References Cited

U.S. PATENT DOCUMENTS

| | | | |
|---|---|---|---|
| 2004/0158334 | A1 | 8/2004 | Kirkpatrick et al. |
| 2005/0201408 | A1 | 9/2005 | Otani et al. |
| 2009/0105848 | A1* | 4/2009 | El-Sayed ................. G05B 9/03 700/21 |
| 2010/0145541 | A1* | 6/2010 | Simon .................... G01D 21/00 700/295 |
| 2010/0222936 | A1 | 9/2010 | Helfrick et al. |
| 2011/0149527 | A1 | 6/2011 | De La Torella |
| 2011/0190955 | A1 | 8/2011 | Kitchener et al. |
| 2011/0310502 | A1 | 12/2011 | Blanchard et al. |

FOREIGN PATENT DOCUMENTS

| | | |
|---|---|---|
| JP | 2012510083 A | 4/2012 |
| WO | 9945621 | 10/1999 |
| WO | 2010023545 | 3/2010 |
| WO | 2010026419 A1 | 3/2010 |

OTHER PUBLICATIONS

U.S. Patent and Trademark Office, International Preliminary Report on Patentability, corresponding PCT application PCT/US2015/055423, 7 pages, dated May 25, 2017.

Machine generated English language translation of JP2002091517, 19 pages, 2002.

Japanese Patent Office, Office Action in corresponding JP2017520454, dated Apr. 19, 2018, 3 pages.

European Patent Office, International Search Report in corresponding PCT/US2015/055423, 12 pages, dated Feb. 23, 2016.

Fieldbus Foundation, Foundation Fieldbus Application Guide 31,25 Kbits/s Intrinsically Safe Systems, 77 pages, 2004.

International Property Office of Singapore, Written Opinion in corresponding SG 112-1702217Q, dated Mar. 8, 2018.

* cited by examiner

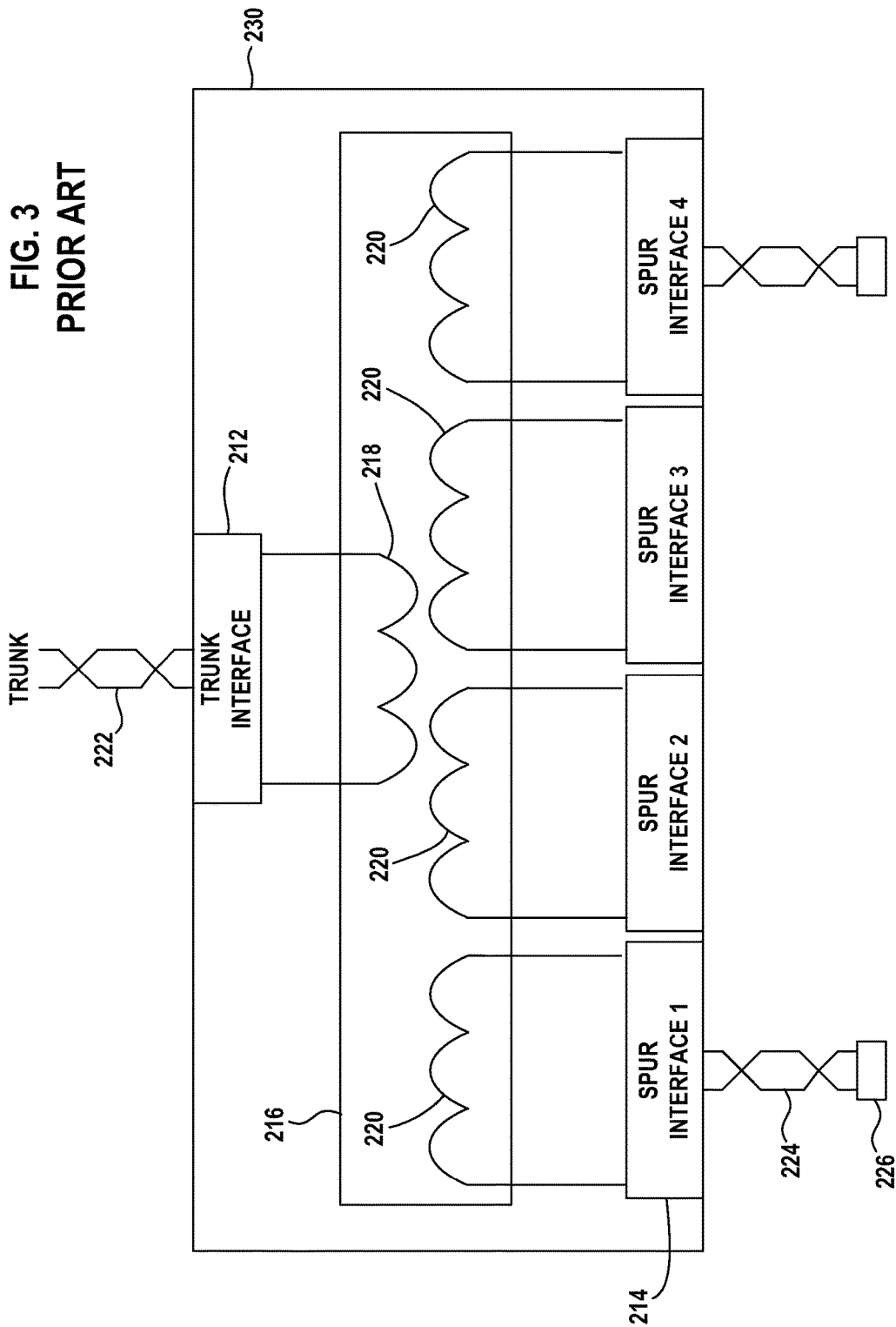

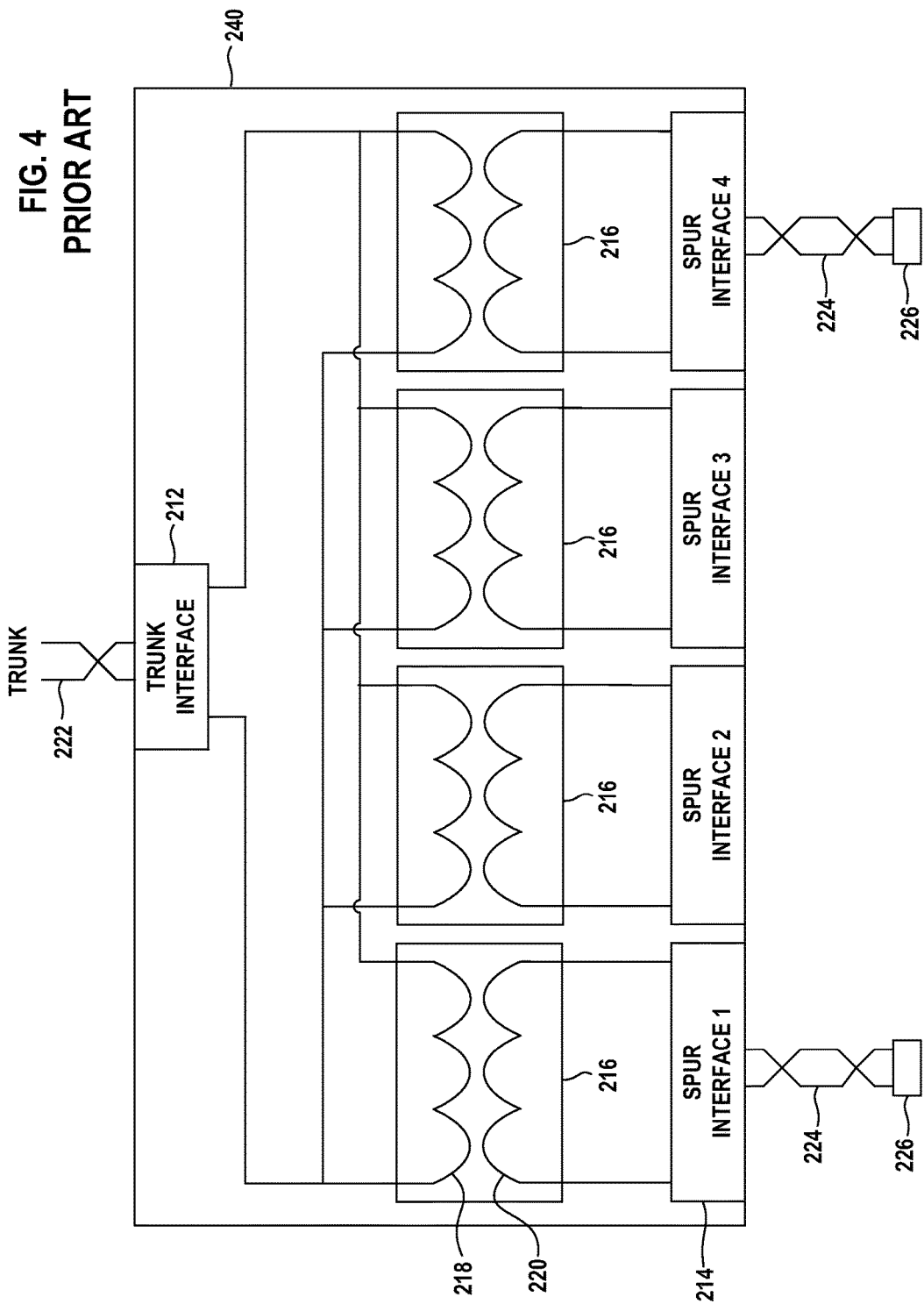

SPUR ISOLATION IN A FIELDBUS NETWORK

FIELD OF THE DISCLOSURE

This disclosure relates to fieldbus systems used in process control, and in particular to a method and a device coupler embodying the method for providing galvanic isolation between a fieldbus trunk and field devices connected to the fieldbus trunk.

BACKGROUND OF THE DISCLOSURE

Some process control systems utilize a two-wire process control network. The two wires transmit analog or digital data signals between a control processor and field devices connected to the network, and are also connected to a power supply that supplies power to those field devices that are powered from the fieldbus network. Terminating impedances may be provided at the ends of the trunk line to avoid signal reflections.

Examples of known two-wire process control networks include, but are not limited to, Foundation Fieldbus H1 and Profibus PA fieldbus networks.

A two-wire process control network often includes a network trunk connected to the controller and spurs that extend from the network trunk and connect the field devices to the network trunk. The trunk and spurs may be arranged in different network topologies known in the art, including (but not limited to) point-to-point topology, trunk-and-spur topology, tree topology, and combinations thereof.

The spurs may be provided by a device coupler that includes a trunk interface or input connecting the device coupler to the network trunk and multiple spur interfaces or outputs that connect multiple spurs to the device coupler. One or more device couplers may be attached to the network trunk. If a device coupler is connected to an end of the network trunk, the device coupler may also provide the terminating impedance for that end of the trunk.

A field device located in a hazardous location (that is, a location where there is a risk of explosion caused by an electrical spark) may be connected to the network trunk by a spur having limited power delivery to the field device to reduce the explosion risk. The spur line may also be galvanically isolated from the network trunk. Galvanic isolation between two network segments breaks direct connections between the segments and so prevents the flow of electrical current between the network trunk and the spurs, further reducing the explosion risk.

Galvanic isolation between trunk and spur segments can also provide other benefits. Isolation reduces the likelihood of ground loops that may propagate transient voltage spikes between trunk and spur segments. Isolation may also prevent propagation of any common-mode noise between trunk and spur segments. That is, galvanic isolation can provide benefits even for network use in non-hazardous locations.

There are several conventional approaches to providing a device coupler having galvanic isolation between the trunk interface and multiple spur interfaces.

FIG. 2 illustrates a device coupler 210 that includes a trunk interface 212 and eight spur interfaces 214. An isolation element formed as a transformer 216 is connected to the trunk interface 212 and the spur interfaces 214. The transformer's primary winding 218 is connected to the trunk interface 212. The spur interfaces 214 are connected in parallel to the transformer's secondary winding 220. The transformer 216 provides isolation between the trunk interface 212 and all the spur interfaces 214; that is, all of the spur interfaces are in the same isolation set because all the spur interfaces are connected to the same transformer secondary winding 220.

FIG. 2 illustrates the device coupler 210 connected to a network trunk 222 and having spurs 224 connected to the spur interfaces labeled "S I 1" and "S I 2". The spurs 224 are connected to field devices 226. Although the single transformer 216 isolates the field devices 226 from the network trunk 222, the field devices 226 are not galvanically isolated from one another. Current can flow between any of the spurs 224 due to all the spur interfaces 214 being connected in parallel with the transformer secondary winding 220.

A modification of the single-transformer approach is shown in FIG. 3, which shows a device coupler 230 connecting the two field devices 226 to the network trunk 222. The device coupler 230 is otherwise similar to the device coupler 210 except for the transformer 216 having multiple secondary windings 220 rather than a single secondary winding. Each secondary winding 220 is connected in series to a respective spur interface 214.

Like in the device coupler 210, the transformer 216 provides isolation between the trunk interface 212 and all the spur interfaces 214. But because each secondary winding 220 is connected to only one spur interface 214, the secondary windings 220 also provide galvanic isolation between the spur interfaces 214. Current cannot flow between the spurs 224 because the secondary windings 220 isolate the spur interfaces 214 from one another.

The isolation between adjacent spur interfaces 214, however, is less than the isolation between each spur interface 214 and the trunk interface 212 due to the spacing requirements of the multiple secondary windings 220.

Yet another approach to providing a device coupler having galvanic isolation between the trunk interface and multiple spur interface is shown in FIG. 4, which illustrates a device coupler 240 connecting the two field devices 226 to the network trunk 222. The device coupler 240 utilizes a modular system in which a separate transformer 216 is provided for each spur interface 214. The primary windings 218 of the transformers 216 are connected in parallel with the trunk interface 212 but the secondary winding 220 of each transformer 216 is connected in series with a respective spur interface 214. Each spur interface 214 is individually isolated from the trunk interface 212 by a dedicated transformer 216.

Each spur interface 214 is also isolated from another spur interface 214 by two transformers 216, that is, any current must pass through two transformers 216 to flow from one spur interface 214 to another spur interface 214. Current cannot flow between the two spurs 224 shown in FIG. 4 unless the current also flows through the two transformers 216 attached to the respective spurs 224.

Helfrick et al. U.S. Pat. No. 7,940,508 owned by the applicant herein and having common inventorship with this application discloses a variation of the modular system shown in FIG. 4. The '508 patent discloses connecting the trunk interface to a backplane. Separate spur interface modules attached to the backplane include a spur interface and an isolation element connected to the spur interface that also connects to the trunk interface through the backplane. Spur interface modules can be added or removed from the backplane as needed.

SUMMARY OF THE DISCLOSURE

Disclosed is a novel approach to providing galvanic isolation between an input or trunk interface and multiple outputs or spur interfaces for connecting field devices to a trunk of a two-wire process control network that supplies data signals and power over the two wires. In possible embodiments the input or trunk interface and the multiple outputs or spur interfaces may be provided as a device coupler for connecting multiple field devices to the trunk.

In an embodiment, a method for connecting a number of outputs to an input for transmission between input and outputs is disclosed. The input is adapted for connection to a network trunk of a two-wire fieldbus network that transmits data signals and power for field devices over the two wires, the outputs being adapted for connection of field devices.

The outputs are divided into two or more sets of outputs. Each set of outputs includes at least two outputs, and each output is in one and only one set of outputs.

Isolation elements are connected in parallel with one another to the input and the isolation elements are connected to the sets of outputs. Each set of outputs is connected in parallel with another to one and only one isolation element, the one isolation element connecting the set of outputs to the input and galvanically isolating the set of outputs and the input.

In a possible embodiment of the method, the isolation elements are transformers. The primary windings of the transformers are connected in parallel with one another to the input and each set of outputs is connected in parallel with one another to the secondary winding of the one transformer.

In an embodiment, a device coupler is disclosed capable of connecting a number of field devices to a network trunk of a two-wire fieldbus network of the type that transmits data signals and power over the two wires.

The device coupler includes a first trunk interface for connecting the device coupler to the network trunk, and two or more spur isolation sets connected to the first trunk interface in parallel with one another.

Each spur isolation set includes a set of two or more spur interfaces and an isolating element coupling the trunk interface and the spur interfaces together. Each spur interface is a member of one and only one set of spur interfaces. In each spur isolation set the spur interfaces connected to the isolating element in parallel with one another. The isolation element galvanically isolates the trunk interface and the spur interfaces from one another.

In a variant embodiment of the device coupler, each isolating element is a transformer having a primary winding connected to the trunk interface and the spur interfaces connected in parallel with one another to a secondary winding of the transformer.

The disclosed approach to providing galvanic isolation between a trunk interface or input and multiple spur interfaces or outputs has a number of advantages.

A noisy spur can be connected to a spur interface or output in one set of spur interfaces or outputs, and other field devices can be connected to spur interfaces or outputs in another set of spur interfaces or outputs. Because the sets of spur interfaces or outputs are isolated from one another, the noise will not couple onto the other sets of spur interfaces or outputs.

Connecting sets of two or more spur interfaces or outputs to respective isolation elements reduces cost as compared to providing a separate isolation element for each spur interface or output. By grouping the spur interfaces or outputs into sets of multiple spur interfaces or outputs, the cost of the isolating element and related circuitry associated with each isolating element is distributed among all the spur interfaces or outputs of the set, greatly reducing the cost per spur interface provided by a device coupler utilizing the disclosed approach.

The sets of multiple spur interfaces or outputs are isolated from one another by at least two isolating elements. By providing isolation between sets of multiple spur interfaces or outputs as well as between each spur interface or output and the trunk interface, the risk of sparking in a control network that provides sufficient power to operate multiple field devices requiring intrinsically safe power for location in a hazardous location is reduced, and, in some applications, the need for discrete safety barriers or specialized power supplies may be eliminated.

The disclosed approach also provides advantages over connecting the spur interfaces or outputs to multiple secondary windings of a transformer having a single primary winding attached to the trunk interface or input. To achieve the same isolation between spur interfaces or outputs as in the disclosed approach would require increasing the spacing between adjacent secondary windings, requiring a transformer that takes up more space than would using multiple transformers having only a single secondary winding.

Other objects and features of the disclosure will become apparent as the description proceeds, especially when taken in conjunction with the accompanying drawing sheets showing one or more embodiments.

BRIEF SUMMARY OF THE DRAWINGS

FIGS. 2-4 illustrate prior art device couplers.

DETAILED DESCRIPTION

Figure 1:
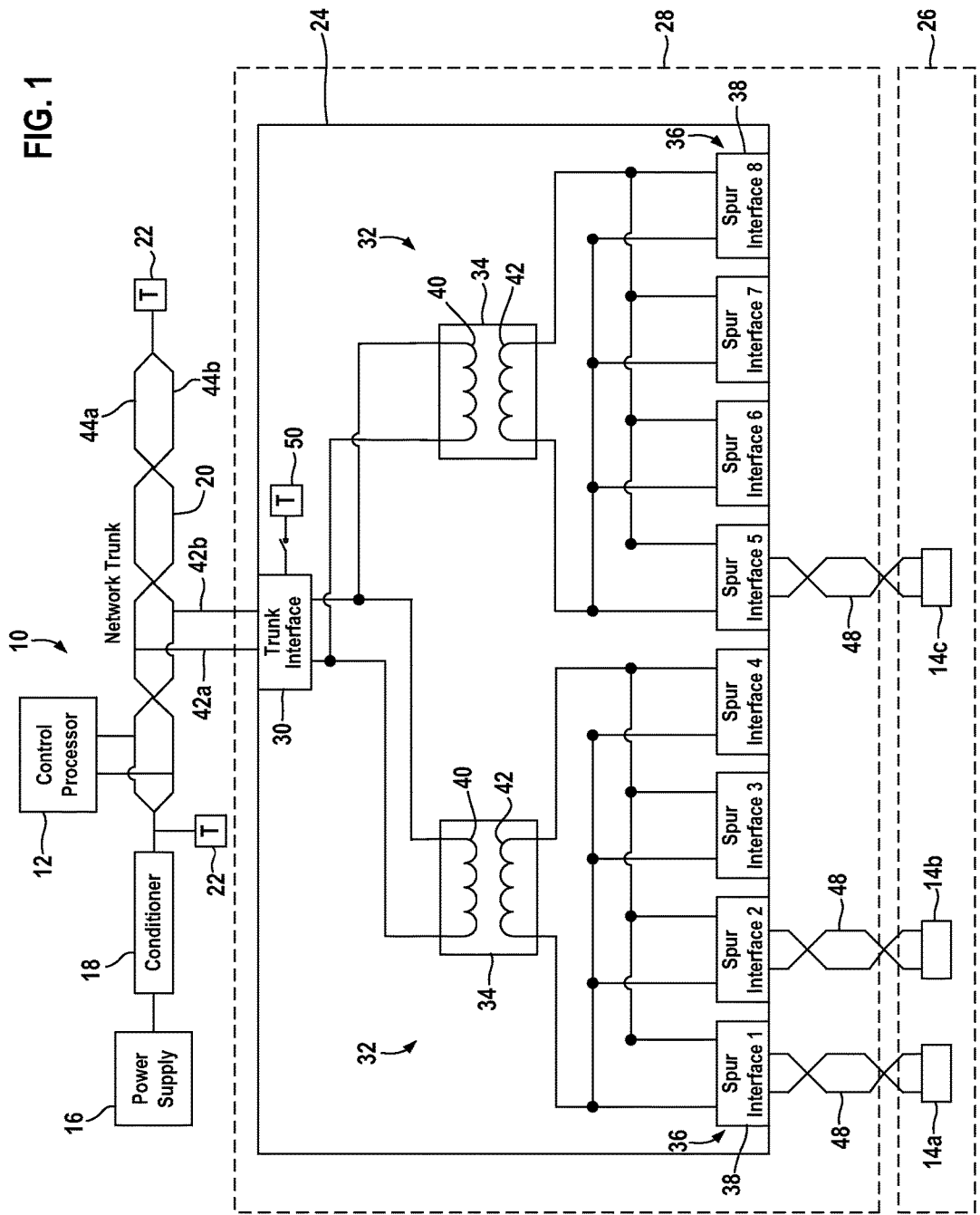
FIG. 1 illustrates a two-wire process control network that includes an embodiment of the disclosed device coupler connecting field devices to the network trunk.
Figure 2:
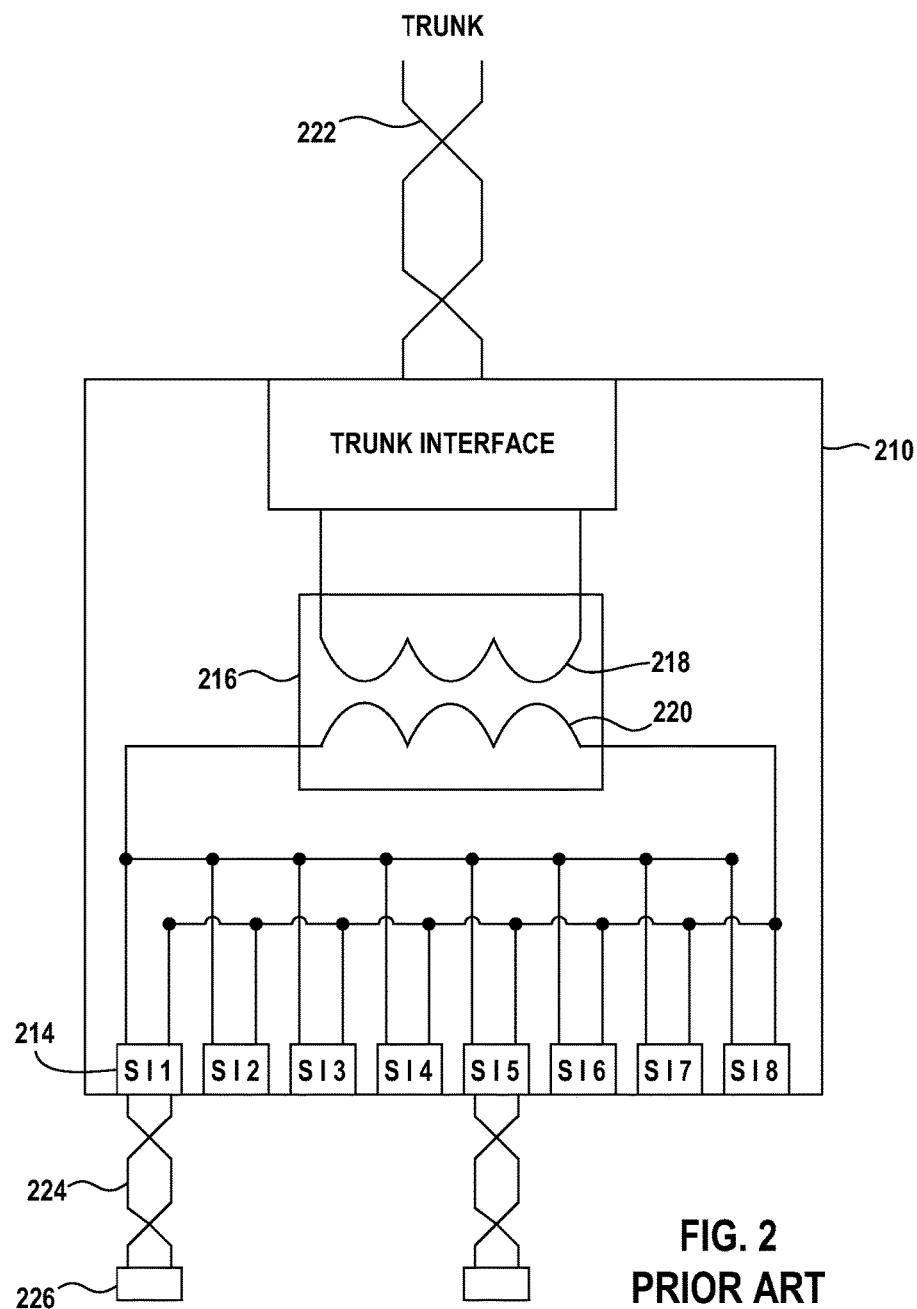

FIG. 1 illustrates a two-wire process control network that transmits process control signals between a control processor 12 and field devices 14, three field devices 14a, 14b, 14c being shown. The illustrated network 10 is a Foundation Fieldbus H1 network that includes a conventional fieldbus power supply 16 and a power conditioner 18 connected to an end of a network trunk 20. Terminating impedances 22 are located at both ends of the network trunk 20.

The control processor 12 is connected to the network trunk 20 to receive and transmit data signals transmitted along the trunk 20. The field devices 14a, 14b, 14c are connected to a device coupler 24 that in turn is connected to the network trunk 20. The field devices 14a, 14b, 14c receive and transmit data signals along the network trunk 20 through the device coupler 24 and also receive power transmitted from the power supply 16 through the network trunk 20 and through the device coupler 24.

The field devices 14 may be process controllers, measurement devices and the like as is known in the fieldbus art. The illustrated field devices 14a, 14b, 14c are located in a hazardous area 26. The device coupler 24 is located in an area 28. The area 28 may be the same as the hazardous area 26 or may be a different hazardous or non-hazardous area than the area 26.

The network trunk 20 is shown in FIG. 1 extending directly between the control processor 12 and the device coupler 24. There may, however, be other device couplers or field devices (not shown) connected to the network trunk 20 between the control processor 12 and the device coupler 24 or connected to the network trunk 20 downstream from the device coupler 24.

The network topology shown in FIG. 1 is a conventional trunk and spur topology; other conventional fieldbuses topologies are known and the device coupler 24 can be used in the other topologies to connect fieldbus devices to fieldbus segments.

The device coupler 24 includes an input trunk interface 30 that connects the device coupler 24 to a network trunk or fieldbus segment and multiple spur isolation sets 32 connected in parallel with the trunk interface 30 that connect the field devices to the device coupler 24. Each spur isolation set 32 includes an isolating element 34 and a set 36 of two or more outputs or spur interfaces 38 that connect the field devices to the device coupler 24. Each spur interface 38 is a member of only one spur interface set 36.

Within a spur isolation set 32, the isolating element 34 is connected to the trunk interface 30 and the spur interfaces 38 are connected in parallel with the isolating element 14. The isolating element 34 connects the trunk interface 30 with each spur interface 38 of the spur interface set 36 and galvanically isolates the trunk interface 30 from each spur interface 30 of the spur interface 36.

The illustrated device coupler 24 has two spur isolation sets 32. One spur isolation set 32 includes a spur interface set 36 that contains the four spur interfaces 38 labeled "SPUR INTERFACE 1" through "SPUR INTERFACE 4" in FIG. 1. The other spur isolation set 32 includes a spur interface set 36 that contains the four spur interfaces 38 labeled "SPUR INTERFACE 5" through "SPUR INTERFACE 8" in FIG. 1. It should be understood that other embodiments of the device coupler 24 could include additional spur isolation sets 32, or that a spur interface set 36 could contain 2, 3, 4, or more than 5 spur interfaces 38.

Each isolating element 34 in the illustrated embodiment is a transformer having a primary winding 40 and a secondary winding 42. The primary winding 40 is connected to the trunk interface 30. The spur interfaces 38 of the spur interface set 36 associated with the isolating element 34 are connected in parallel with the secondary winding 42. The secondary windings 42 are not connected to one another.

The device coupler 24 is shown in FIG. 1 being connected to the network trunk 20 by a set or pair of terminals 44a, 44b that are connected to respective wires 46a, 46a of the network trunk 20.

FIG. 1 illustrates one field device 14a connected to the spur interface 38 labeled "SPUR INTERFACE 1", a second field device 14b connected to the spur interface 38 labeled "SPUR INTERFACE 2", and a third field device 14b connected to the spur interface 38 labeled "SPUR INTERFACE 5". That is, the field devices 14a, 14b are connected to one spur interface 36 and the other field device 14b is connected to the other spur interface set 36. Each field device 14 is connected to its respective spur interface 36 by a two-wire spur 48 for transmission of data signal and power between the field device 14 and the device coupler 24.

As is evident in FIG. 1, each field device 14 is galvanically isolated from the trunk interface 30 by the isolating element 34 of the spur isolation set to which the field device 14 is attached. A field device attached to one spur isolation set 32 is galvanically isolated from a field device attached to another spur isolation set 32 by both isolating elements 34 because any current flow between a pair of spur isolation sets 32 must flow through both isolating elements 34 of the two spur isolation sets 32.

In FIG. 1, the field devices 14a, 14b are galvanically isolated from the trunk interface 30 and the field device 14c is galvanically isolated from the field devices 14a, 14b by both transformers 34. If the spur 48 connected to the field device 14c is noisy, the noise will not couple onto the spurs 48 connected to the field devices 14a, 14b. If it known that a field device 14c generates noise, the spur isolation set 32 may be dedicated solely for connection of the field device 14c.

The device coupler 24 also includes a terminating impedance 50 that is selectably connectable to the trunk interface 30. If the device coupler 24 is placed at the end of the network trunk 20, the device coupler impedance 50 can be manually or automatically connected to the trunk interface 30 in conventional manner to terminate an end of the network trunk 20.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art, as well as such changes and alterations that fall within the purview of the following claims.

The invention claimed is:

1. A device coupler capable of connecting a plurality of field devices to a network trunk of a two-wire fieldbus network of the type that transmits data signals and power over the two wires, the device coupler comprising:
   a trunk interface for connecting the device coupler to the network trunk and two or more spur isolation sets connected to the trunk interface in parallel with one another;
   each spur isolation set comprising: an isolating element connected to the trunk interface and a set of two or more spur interfaces connected to the isolating element, the spur interfaces being connected in parallel with one another to the isolating element, the isolating element connecting the trunk interface and the spur interfaces together and galvanically isolating the trunk interface from the spur interfaces; and
   in each spur isolation set: the isolating element comprises a respective transformer, the transformer comprising a first transformer winding connected to the trunk interface and a second transformer winding connected to the set of spur interfaces.

2. The device coupler of claim 1 wherein the device coupler is connected to the network trunk, a field device is attached to one of the spur interfaces of the device coupler, and at least one of the field device and the device coupler is located in a hazardous area.

3. The device coupler of claim 1 wherein the first transformer windings of the spur isolation sets are connected to the trunk interface in parallel with one another.

4. The device coupler of claim 1 wherein the two or more spur interfaces of each spur isolation set are connected to the second transformer winding of the spur isolation set in parallel with one another.

5. The device coupler of claim 1 wherein the second transformer windings of the spur isolation sets are not connected to one another.

6. The field device coupler of claim 1 wherein the device coupler comprises a terminating impedance being adapted to terminate an end of the network trunk.

7. The device coupler of claim 1 wherein the trunk interface is connected to the network trunk and a power supply is connected to the network trunk.

8. The device coupler of claim 7 wherein a field device is connected to one of the spur interfaces of the device coupler and the power supply supplies power to the field device.

9. A device coupler capable of connecting a plurality of field devices to a network trunk of a two-wire fieldbus network of the type that transmits data signals and power over the two wires, the device coupler comprising:

a trunk interface for connecting the device coupler to the network trunk and two or more spur isolation sets connected to the trunk interface in parallel with one another;

each spur isolation set comprising: an isolating element connected to the trunk interface and a set of two or more spur interfaces connected to the isolating element, the spur interfaces being connected in parallel with one another to the isolating element, the isolating element connecting the trunk interface and the spur interfaces together and galvanically isolating the trunk interface from the spur interfaces;

the two or more spur isolation sets comprises a first spur isolation set and a second isolation set;

the plurality of spur interfaces of the first spur isolation set is galvanically isolated from the plurality of spur interfaces of the second spur isolation set by at least the isolating elements of the first and second spur isolation sets; and the isolating element of each of the two or more spur isolation sets is a transformer whereby the plurality of spur interfaces of the first spur isolation set is galvanically isolated from the plurality of spur interfaces of the second spur isolation set by at least the transformers of the first and second spur isolation sets.

10. The device coupler of claim 9, wherein the trunk interface is connected to the network trunk and a power supply is connected to the network trunk.

11. The device coupler of claim 10 wherein a field device is connected to one of the spur interfaces of the device coupler and the power supply supplies power to the field device.

12. The field device coupler of claim 9 wherein the device coupler comprises a terminating impedance being adapted to terminate an end of the network trunk.

13. The device coupler of claim 9, wherein the trunk interface is connected to the network trunk, a field device is attached to one of the spur interfaces of the device coupler, and the field device is located in a hazardous area.

14. The device coupler of claim 9, wherein the trunk interface is connected to the network trunk and the device coupler is located in a hazardous area.

15. A method of connecting a plurality of outputs to an input for transmission between input and outputs, the input being adapted for connection to a network trunk of a two-wire fieldbus network that transmits data signals and power for field devices over the two wires, the outputs being adapted for connection of field devices, the method comprising the step of:

dividing all of the plurality of outputs into two or more sets of outputs, each output being in one and only one set of the two or more sets of outputs, each set of outputs including two or more outputs; and connecting two or more transformers in parallel with one another to the input and connecting the two or more transformers to the sets of outputs, each set of outputs being connected in parallel with one and only one respective transformer, the respective transformer connecting the set of outputs to the input and galvanically isolating the set of outputs and the input;

whereby each set of outputs are galvanically isolated from the network trunk and from the other sets of outputs when the input is connected to the network trunk.

16. The method of claim 15 wherein the step of connecting a respective transformer comprises the step of connecting a first winding of the transformer to the input and connecting the set of outputs associated with the transformer in parallel with a second winding of the transformer.

17. The method of claim 16 wherein after connecting the two or more transformers to the input and outputs, each set of outputs is galvanically isolated from each other set of outputs by at least two of the transformers.

18. The method of claim 15 comprising the step of connecting a field device to one of the outputs, the field device being located in a hazardous area.

* * * * *